United States Patent

Sakurai

(10) Patent No.: US 9,257,911 B2
(45) Date of Patent: Feb. 9, 2016

(54) SWITCHING POWER SOURCE DEVICE WITH TIMING CONTROL OF SYNCHRONOUS RECTIFIER

(71) Applicant: FUJI ELECTRIC CO., LTD., Kawasaki-shi (JP)

(72) Inventor: Masahiko Sakurai, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 308 days.

(21) Appl. No.: 13/931,009

(22) Filed: Jun. 28, 2013

(65) Prior Publication Data

US 2014/0003097 A1 Jan. 2, 2014

(30) Foreign Application Priority Data

Jun. 27, 2012 (JP) ................................ 2012-144283

(51) Int. Cl.
*H02M 3/335* (2006.01)
*H02M 3/158* (2006.01)

(52) U.S. Cl.
CPC ........ *H02M 3/33507* (2013.01); *H02M 3/1588* (2013.01); *H02M 3/33592* (2013.01); *Y02B 70/1466* (2013.01); *Y02B 70/1475* (2013.01)

(58) Field of Classification Search
CPC .................................................. H02M 3/33507
See application file for complete search history.

(56) References Cited

U.S. PATENT DOCUMENTS

| | | | | |
|---|---|---|---|---|
| 3,671,870 A | * | 6/1972 | Wellhausen | 455/169.2 |
| 6,870,747 B2 | * | 3/2005 | Bridge | 363/21.06 |
| 7,869,231 B2 | * | 1/2011 | Cohen | 363/21.14 |
| 8,159,838 B2 | * | 4/2012 | Chen et al. | 363/21.13 |
| 8,570,772 B2 | * | 10/2013 | Morris et al. | 363/21.14 |
| 2003/0179123 A1 | * | 9/2003 | DeVilbiss | 341/157 |
| 2006/0171180 A1 | | 8/2006 | Kyono | |
| 2007/0085589 A1 | * | 4/2007 | Yoshikawa | 327/333 |
| 2008/0164859 A1 | * | 7/2008 | Peng et al. | 323/318 |
| 2009/0279326 A1 | * | 11/2009 | Hyuugaji | 363/21.06 |
| 2010/0182806 A1 | * | 7/2010 | Garrity et al. | 363/21.14 |

FOREIGN PATENT DOCUMENTS

JP 4158054 B2 10/2008

* cited by examiner

*Primary Examiner* — Emily P Pham
(74) *Attorney, Agent, or Firm* — Rabin & Berdo, P.C.

(57) ABSTRACT

A synchronous rectification switching power source device accurately determines the timing of the turning off of a synchronous rectifier switching element regardless of the state of the load, and a synchronous rectification period is utilized to the maximum. The switching power source device is configured of a main FET connected to a primary winding of a transformer, a snubber circuit connected to the primary winding, a synchronous rectifier FET connected to a secondary winding of the transformer, a diode connected to the synchronous rectifier FET, a synchronous rectifier FET drain voltage detection unit, an output voltage detection unit, and a drive control unit. The drive control unit accurately determines the timing of the turning off of the synchronous rectifier switching element using a unit that detects the on/off state of the main FET, a variable pulse generator unit, a count value generated by a counter unit, and a threshold value.

10 Claims, 9 Drawing Sheets

SWITCHING POWER SOURCE DEVICE WITH TIMING CONTROL OF SYNCHRONOUS RECTIFIER

BACKGROUND OF THE INVENTION

1. Technical Field

The present invention relates to a switching power source device that outputs direct current voltage, and in particular, relates to a switching power source device that includes a synchronous rectification circuit.

2. Related Art

Figure 9:
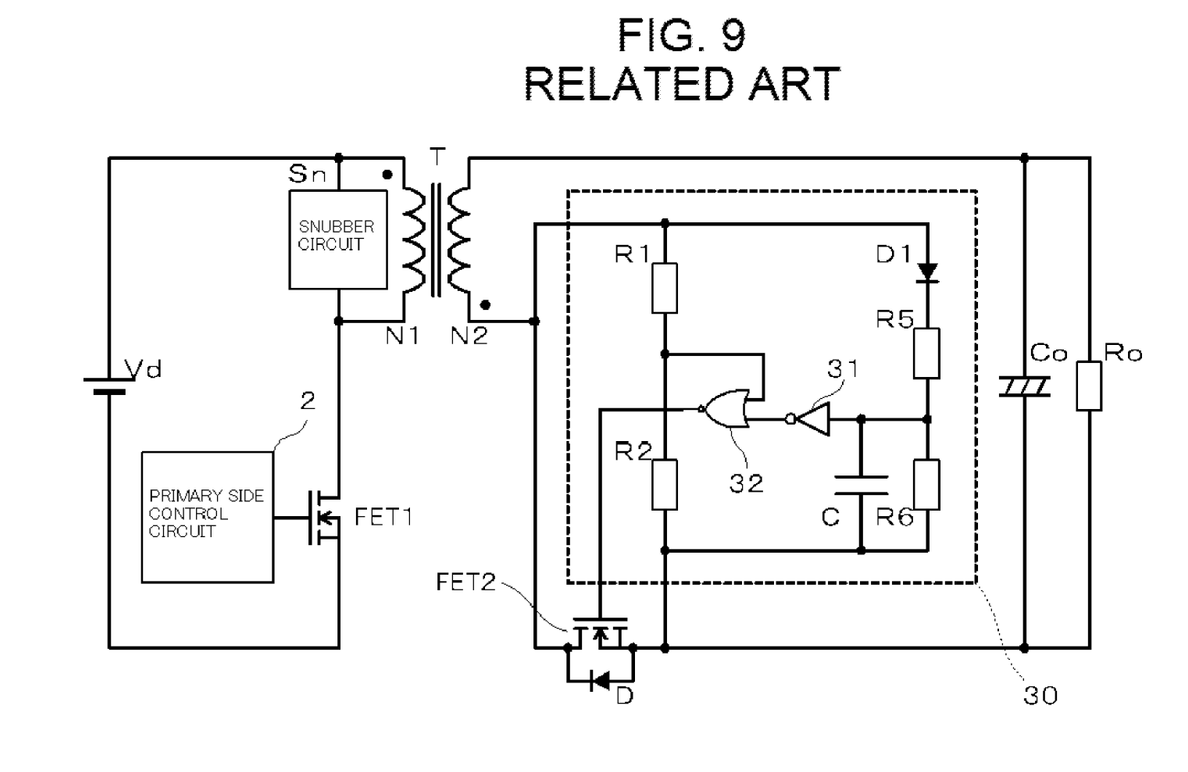
FIG. 9 is a circuit diagram showing an embodiment of heretofore known technology.

FIG. 9 shows a configuration of heretofore known technology (Japanese Patent No. 4,158,054) of a switching power source device using a synchronous rectification circuit. The switching power source device is configured of a main switching element FET1, connected in series to a primary winding N1 of a transformer T, a snubber circuit Sn connected in parallel to the primary winding N1, a primary side control circuit 2 that drives the main switching element FET1, a synchronous rectifier switching element FET2, connected in series to a secondary winding N2 of the transformer T, a diode D connected in parallel to the synchronous rectifier switching element FET2, and a secondary side control circuit 30 that drives the synchronous rectifier switching element FET2.

The secondary side control circuit 30 has a voltage divider circuit, which divides the drain-to-source voltage of the synchronous rectifier switching element FET2 using resistors R1 and R2, and a time constant generating capacitor C, which is charged via a diode D1 and resistor R5 in accordance with the drain-to-source voltage of the synchronous rectifier switching element FET2. A discharge resistor R6 is connected in parallel to the capacitor C. Also, a NOT circuit 31, whose output is inverted when the voltage of the capacitor C reaches a predetermined threshold value, is connected to the high potential side of the capacitor C. A connection point of the resistors R1 and R2 and the output terminal of the NOT circuit 31 are connected one each to input terminals of a NOR circuit 32, and the output terminal of the NOR circuit 32 is connected to a control terminal of the synchronous rectifier switching element FET2.

A series circuit of the primary winding N1 of the transformer T and the main switching element FET1 is connected to a direct current power source Vd. Also, a parallel circuit of a smoothing capacitor Co and load Ro is connected to a series circuit of the secondary winding N2 of the transformer T and the synchronous rectifier switching element FET2.

Next, a description will be given of an operation of the switching power source device configured in this way. The main switching element FET1 carries out an on/off operation such that frequency and duty ratio vary in accordance with the output voltage, wherein, when the main switching element FET1 is turned on, current flows through the primary winding N1, and energy is accumulated in the transformer T. At the same time, voltage is generated in the secondary winding N2 such that the potential on the side connected to the drain terminal of the synchronous rectifier switching element FET2 increases. At this time, the connection point of the resistors R1 and R2 is at an H level. Also, as the capacitor C is charged, the output of the NOT circuit 31 changes from an H level to an L level. That is, the output of the NOR circuit 32 is an L level, and the synchronous rectifier switching element FET2 maintains an off-state.

Presently, the main switching element FET1 is turned off, and the secondary winding N2 discharges the energy accumulated in the transformer T through the diode D. At this time, the connection point of the resistors R1 and R2 is at an L level. Also, as the capacitor C is charged, the output of the NOT circuit 31 is an L level. That is, the output of the NOR circuit 32 is an H level, and the synchronous rectifier switching element FET2 is turned on.

As the drain-to-source voltage is practically zero for the period for which the synchronous rectifier switching element FET2 is in an on-state, the capacitor C is discharged by the resistor R6. When the voltage of the capacitor C falls below the threshold value of the NOT circuit 31, the output of the NOT circuit 31 changes from an L level to an H level. That is, the output of the NOT circuit 32 changes from an H level to an L level, and the synchronous rectifier switching element FET2 is turned off.

Thereafter, the switching power source device repeats the heretofore described operation.

In this way, as a synchronous rectification period is generated without the current flowing through the transformer T being detected directly, the switching power source device is not affected by the on-state resistance of the synchronous rectifier switching element FET2. Therefore, as it is possible to normally operate a synchronous rectifier switching element FET2 with a smaller on-state resistance, it is possible to make efficiency high.

Also, the switching power source device is such that it is possible to prevent a reverse flow of power from the direct current voltage output side by the time constant of the capacitor C being regulated, and the synchronous rectifier switching element FET2 being turned off before all the energy of the secondary winding N2 is discharged.

Furthermore, the switching power source device is such that, as the synchronous rectification period is generated by an integrator configured of the resistors R5 and R6 and capacitor C, it is possible to suppress the effect of noise.

However, the switching power source device described in Japanese Patent No. 4,158,054 is such that the capacitor C charge and discharge voltage and time differ when a different load is connected. Because of this, there is a need for threshold value regulation in order to adjust the timing at which the synchronous rectifier switching element FET2 is turned off to the timing at which the current flowing through the secondary winding N2 reaches zero. That is, it is necessary to determine the turning off timing so that the synchronous rectifier switching element FET2 can be turned off with sufficient leeway before the main switching element FET1 is next turned on. Also, as the maximum value of the capacitor C charge voltage decreases in the case of a light load, the threshold value voltage is relatively high, and the synchronous rectification period becomes shorter.

SUMMARY OF THE INVENTION

The invention, having been contrived in order to solve the heretofore described problems, has an object of providing a highly efficient synchronous rectification switching power source device by enabling the timing of the turning off of a synchronous rectifier switching element to be accurately determined, and utilizing a synchronous rectification period to the maximum.

A first aspect of the invention is a switching power source device that converts direct current voltage applied to input terminals and outputs direct current voltage from output terminals, wherein a main switching element connected in series to a primary winding of a transformer is connected between the input terminals, and a synchronous rectifier switching element connected in series to a secondary winding of the transformer is connected between the output terminals. The switching power source device includes a rectifier element connected in parallel to the synchronous rectifier switching element, a drive control unit that drives the main switching element and synchronous rectifier switching element, an element voltage detection unit that detects the value of the voltage across the synchronous rectifier switching element, an output voltage detection unit that detects the value of the output voltage between the output terminals, a variable pulse generator unit that generates a clock pulse of a frequency in accordance with the difference between the value of the voltage across the synchronous rectifier switching element and the output voltage value detected by the voltage detection units, a counter unit that increases or reduces a count value in accordance with the clock pulse, and an on/off control unit that maintains the synchronous rectifier switching element in an on-state until the main switching element is turned off and the count value reaches a predetermined value.

The heretofore described switching power source device utilizes the fact that the products of potential difference×time in (1) and (2) below are equal.

(1) The product of the difference in potential between the element voltage and output voltage×the time for which the main switching element is in an on-state.

(2) The product of the difference in potential between the element voltage and output voltage×the time for which the main switching element is in an off-state.

That is, the count values in (3) and (4) below are equal.

(3) The count value reached by counting at a frequency proportional to the difference in potential between the element voltage and output voltage in a period for which the main switching element is in an on-state.

(4) The count value reached by counting at a frequency proportional to the difference in potential between the element voltage and output voltage in a period for which the main switching element is in an off-state.

Consequently, it is sufficient that the timing at which the count value in (4) becomes equal to the count value in (3) is taken to be the timing at which the synchronous rectifier switching element is turned off.

Therefore, the switching power source device of this aspect of the invention is such that, as it is possible to accurately determine the timing of the turning off of the synchronous rectifier switching element, and to utilize the synchronous rectification period to the maximum, it is possible to make the efficiency of the device high.

A second aspect of the invention is a switching power source device that converts direct current voltage applied to input terminals and outputs direct current voltage from output terminals, wherein a first series circuit configured of a synchronous rectifier switching element and a main switching element is connected between the direct current input terminals, one end of an inductor is connected to a connection point of the main switching element and synchronous rectifier switching element, and a second series circuit configured of the synchronous rectifier switching element and inductor is connected between the direct current output terminals. The switching power source device includes a drive control unit that drives the main switching element and synchronous rectifier switching element, an element voltage detection unit that detects the value of the voltage across the synchronous rectifier switching element, an output voltage detection unit that detects the value of the output voltage between the direct current output terminals, a variable pulse generator unit that generates a clock pulse of a frequency in accordance with the difference between the value of the voltage across the synchronous rectifier switching element and the output voltage value detected by the voltage detection units, a counter unit that increases or reduces a count value in accordance with the clock pulse, and an on/off control unit that maintains the synchronous rectifier switching element in an on-state until the main switching element is turned off and the count value reaches a predetermined value.

The heretofore described switching power source device utilizes the fact that the products of potential difference×time in the heretofore described (1) and (2) are equal. That is, the count values in the heretofore described (3) and (4) are equal.

Consequently, it is sufficient that the timing at which the count value in (4) becomes equal to the count value in (3) is taken to be the timing at which the synchronous rectifier switching element is turned off.

Therefore, the switching power source device of this aspect of the invention is such that, as it is possible to accurately determine the timing of the turning off of the synchronous rectifier switching element, and to utilize the synchronous rectification period to the maximum, it is possible to make the efficiency of the device high.

The switching power source device according to the first and second aspects of the invention is such that an off-state of the main switching element is detected by one of a control signal that drives the main switching element, the element voltage detection unit, or a detection unit that detects the voltage across the transformer.

According to the heretofore described switching power source device, it is possible to optimize the wiring layout by selecting the main switching element off-state detection unit and, in addition to making the efficiency of the device high, it is possible to reduce cost and improve noise resistance. When detecting the control signal that drives the main switching element, optical isolation using a photocoupler, or an isolating unit such as a pulse transformer, can be useful.

The switching power source device according to the first aspect of the invention is such that the counter unit has an up/down switch circuit that switches between counting up and counting down in accordance with the on/off state of the main switching element.

The heretofore described switching power source device utilizes the fact that the products of potential difference×time in the heretofore described (1) and (2) are equal. That is, the count values in the heretofore described (3) and (4) are equal.

Consequently, in order that the count value returns to zero in one on/off cycle of the main switching element, it is sufficient that the point at which the count value becomes zero is taken to be the timing at which the synchronous rectifier switching element is turned off.

Therefore, the switching power source device of this aspect of the invention is such that, as it is possible to accurately determine the timing of the turning off of the synchronous rectifier switching element, and to utilize the synchronous rectification period to the maximum, it is possible to make the efficiency of the device high.

The switching power source device according to the first aspect of the invention includes a preset value computation circuit, connected to the counter unit, that computes a count value to be set in the counter unit using the value of the voltage across the synchronous rectifier switching element, the value of the output voltage between the direct current output terminals, and the time for which the main switching element is in an on-state, and a preset permission unit that, when detecting the instant at which the main switching element switches to an off-state, inputs the count value into the counter unit.

According to the heretofore described switching power source device, as the count cycle is constant, it is possible every time to turn off the synchronous rectifier switching element the same amount of time earlier than the time at which the main switching element is turned on. Also, as the count value is obtained by computation, it is possible to shorten the count cycle. Therefore, as it is possible to more accurately determine the turn-off timing, it is possible to utilize the synchronous rectification period to the maximum. Consequently, it is possible to make the efficiency of the device high.

According to the switching power source device of the invention, it is possible to accurately determine the timing of the turning off of the synchronous rectifier switching element, regardless of the state of the load, because of which it is possible to utilize the synchronous rectification period to the maximum, whereby an excellent advantage may be obtained in that it is possible to make the efficiency of the device high.

DETAILED DESCRIPTION OF THE EMBODIMENTS

Hereafter, referring to the attached drawings, a description will be given of embodiments of the invention.

First Embodiment

Figure 1:
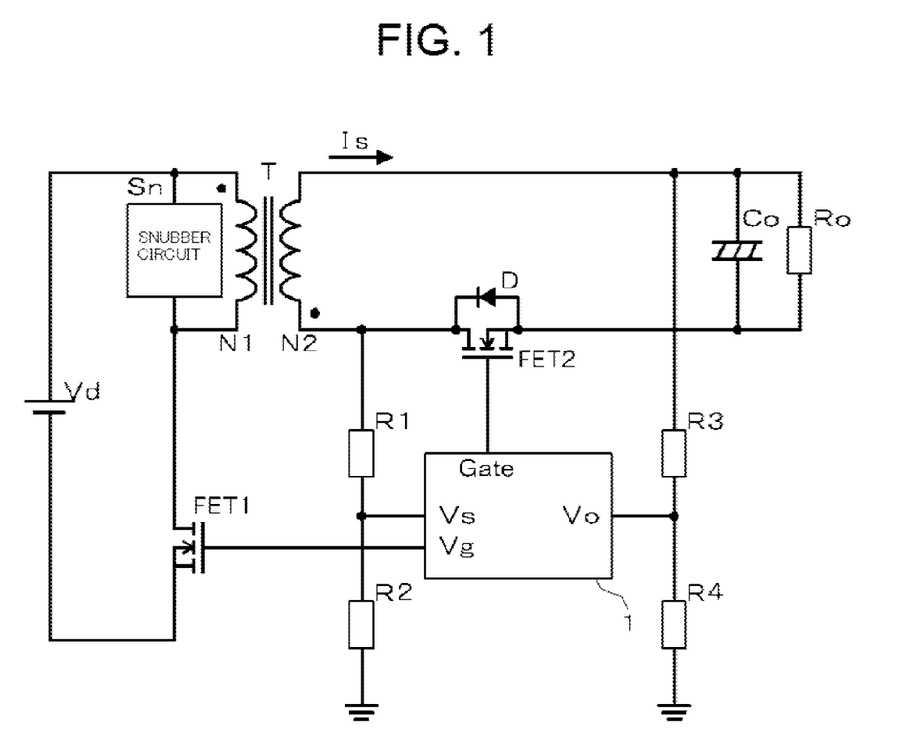
FIG. 1 is a diagram showing a main circuit of first to third embodiments of the invention.

FIG. 1 is a diagram showing a switching power source device according to a first embodiment of the invention, wherein portions given the same reference signs as in FIG. 9 represent the same portions. Next, a description will be given of the circuit configuration of the first embodiment.

The circuit of the first embodiment of the invention is configured of a primary side circuit into which a direct current voltage is input, a secondary side circuit that outputs a direct current voltage, voltage detecting voltage divider resistors R1 to R4, and a drive control unit 1 that drives switching elements.

The primary side circuit is configured of a main switching element FET1, connected in series to a primary winding N1 of a transformer, and a snubber circuit Sn connected in parallel to the primary winding N1. The secondary side circuit is configured of a synchronous rectifier switching element FET2, connected in series to a secondary winding N2 of the transformer, and a diode D connected in parallel to the synchronous rectifier switching element FET2. The voltage divider resistors R1 and R2 are connected between the drain of the synchronous rectifier switching element FET2 and the ground, while the voltage divider resistors R3 and R4 are connected between a direct current voltage output terminal and the ground.

The drive control unit 1 is such that an element voltage detection terminal Vs is connected to a connection point of the voltage divider resistors R1 and R2, while an output voltage detection terminal Vo is connected to a connection point of the voltage divider resistors R3 and R4. Also, Vg is connected to a control terminal of the main switching element FET1, while Gate is connected to a control terminal of the synchronous rectifier switching element FET2.

A direct current voltage source Vd is connected to a direct current voltage input terminal. A parallel circuit of a smoothing capacitor Co and load Ro is connected to the direct current voltage output terminal. The drive control unit 1 of FIG. 1 is depicted as one block, but it is preferable that a primary side control circuit 2 and secondary side control circuit 33 are isolated, or configured of separate elements.

Figure 2:
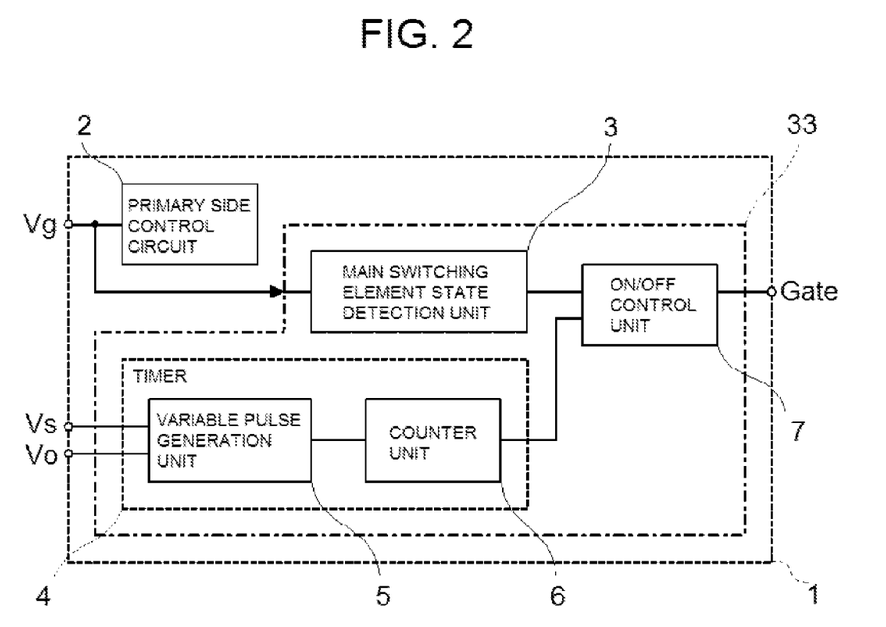
FIG. 2 is a schematic diagram showing a drive control unit of first to fourth embodiments of the invention.

FIG. 2 is a diagram showing a schematic view of the drive control unit according to the first embodiment of the invention. The drive control unit 1 is configured of the primary side control circuit 2, which drives the main switching element FET1, and the secondary side control circuit 33 having a main switching element state detection unit 3, which is connected to the primary side control circuit 2 and detects the on/off state of the main switching element FET1, a timer circuit 4 that, the connection point of the voltage divider resistors R1 and R2 being connected to the element voltage detection terminal Vs and the connection point of the voltage divider resistors R3 and R4 being connected to the output voltage detection terminal Vo, generates a time based on the difference between the two detected voltage values, and an on/off control unit 7, which is connected to the main switching element state detection unit 3 and timer circuit 4 and drives the synchronous rectifier switching element FET2. The timer circuit 4 is configured of a variable pulse generator unit 5, which outputs a pulse whose frequency varies in accordance with the difference between the two detected voltage values (element voltage Vs−output voltage Vo), and a counter unit 6, which counts the pulse number and outputs a count value as the output of the timer circuit 4.

In FIG. 2, the on/off state of the main switching element FET1 is detected from a control signal of the primary side control circuit 2, but the detection unit is not limited to this. The on/off state of the main switching element FET1 may also be detected from the voltage between the drain and source of the synchronous rectifier switching element FET2 or from the voltage across the transformer.

Figure 3:
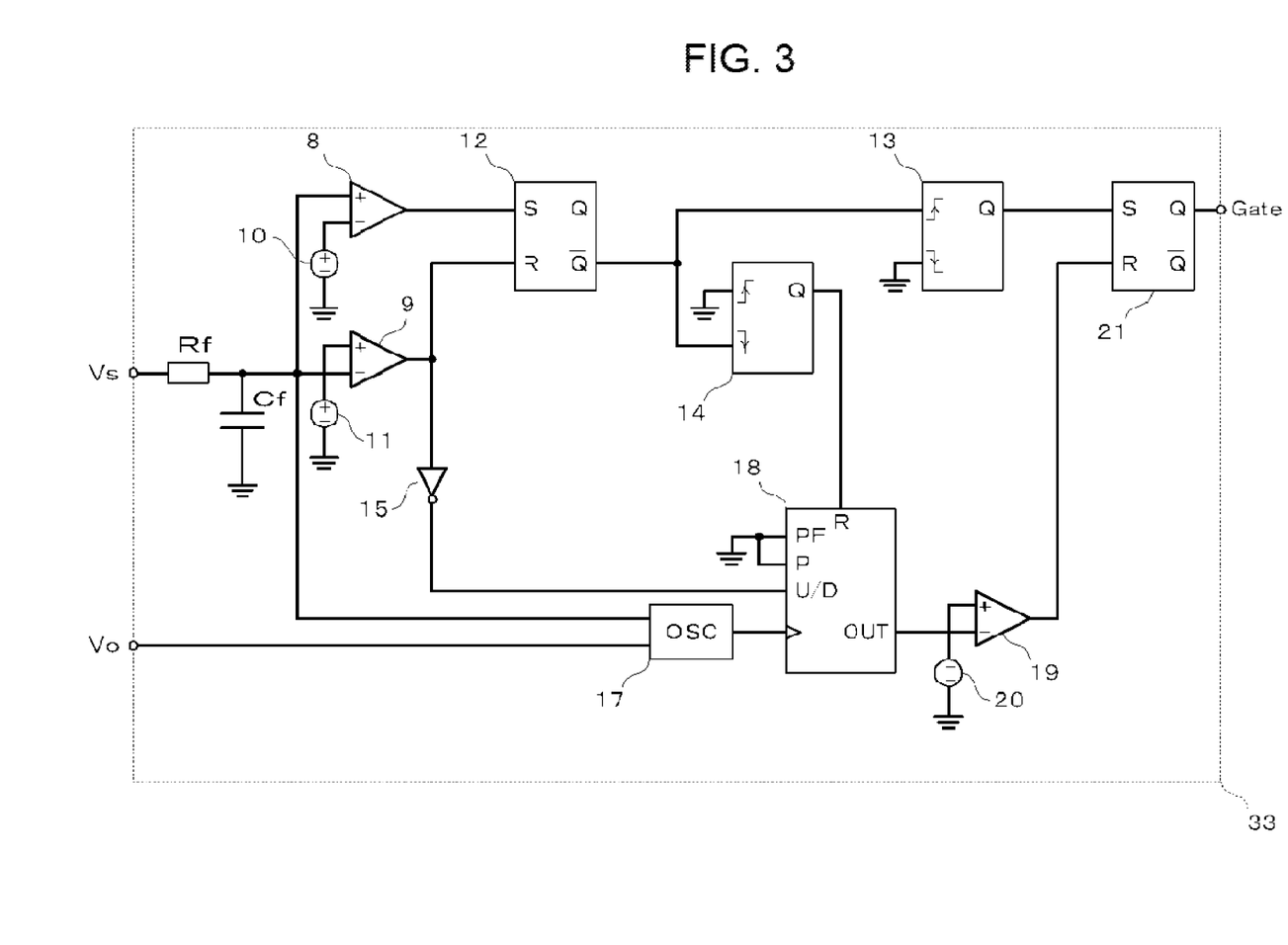
FIG. 3 is a diagram showing the drive control unit of the first embodiment of the invention.

FIG. 3 is a diagram showing one example of the drive control unit 1 according to the first embodiment of the invention. Next, a description will be given of the configuration of the drive control unit 1 according to the first embodiment. The drive control unit 1 according to the first embodiment of the invention, in the same way as in FIG. 2, has portions corresponding to the main switching element state detection unit 3, variable pulse generator unit 5, counter unit 6, and on/off control unit 7. As the primary side control circuit 2 is a general drive circuit, a description is omitted.

A description will be given of the portion in FIG. 3 corresponding to the main switching element state detection unit 3 of FIG. 2. The positive input terminal of a comparator 8 and the negative input terminal of a comparator 9 are connected via an RC filter to the element voltage detection terminal Vs. The outputs of the comparator 8 and comparator 9 are connected respectively to the S and R terminals of a set/reset flip-flop (an SR flip-flop, hereafter referred to as an SRFF) 12. The negative input terminal of the comparator 8 is connected to a direct current voltage source 10, while the positive input terminal of the comparator 9 is connected to a direct current voltage source 11. The output voltage values of the direct current voltage sources 10 and 11 have a relationship such that the output voltage value of the direct current voltage source 10 is greater than the output voltage value of the direct current voltage source 11. That is, the on/off state of the main switching element FET1 is detected by a hysteresis comparator configured of the comparators 8 and direct current voltage sources 10 and 11. It is preferable that it can be detected that the main switching element FET1 has been definitely turned on or turned off with the output voltage values of the direct current voltage sources 10 and 11 such that, for example, that of the direct current voltage source 10 is at 90% of the maximum value of the element voltage Vs and that of the direct current voltage source 11 is at 10% of the maximum value of the element voltage Vs. The output voltage values of the direct current voltage sources 10 and 11 are designed as appropriate, and are not limited.

The inverted output terminal of the SRFF 12 is connected to a rise detection terminal of a monostable multivibrator (hereafter referred to as an MM) 13. The output terminal of the MM 13 is connected to an SRFF 21, which is the on/off control unit 7.

A description will be given of the portion in FIG. 3 corresponding to the variable pulse generator unit 5 of FIG. 2. One input terminal of a pulse generator unit 17 is connected via the RC filter to the element voltage detection terminal Vs, while the other input terminal of the pulse generator unit 17 is connected to the output voltage detection terminal Vo. The output terminal of the pulse generator unit 17 is connected to a clock pulse input terminal of an up/down counter 18.

A description will be given of the portion in FIG. 3 corresponding to the counter unit 6 of FIG. 2. The up/down counter 18 counts up or counts down every time a pulse is input into the clock pulse input terminal. Herein, a U/D terminal of the up/down counter 18 is connected via a NOT circuit 15 to the output terminal of the comparator 9, a count-up operation is carried out when an H level is input, and a count-down operation is carried out when an L level is input. The reset terminal of the up/down counter 18 is connected to the output terminal of an MM 14. The input terminal of the MM 14 is a fall detector, and is connected to the inverted output terminal of the SRFF 12. The output of the up/down counter 18 is connected to the negative input terminal of a comparator 19, and the output terminal of the comparator 19 is connected to the SRFF 21. The positive input terminal of the comparator 19 is connected to a direct current voltage source 20, and a predetermined threshold value Vth is input into the comparator 19.

The output terminal of the on/off control unit 7 of FIG. 2 in FIG. 3 is connected via the Gate terminal to the control terminal of the synchronous rectifier switching element FET2. A description will be given of an outline of an operation of the switching power source device according to the first embodiment of the invention. In the event that the main switching element FET1 is turned on when the synchronous rectifier switching element FET2 is in an on-state, current flows back from the direct current voltage output terminal side. That is, it is necessary for the synchronous rectifier switching element FET2 to be turned off before the main switching element FET1 is next turned on.

According to the drive control unit of FIG. 3, the synchronous rectifier switching element FET2 is turned off when a voltage value converted from the count value of the up/down counter 18 falls below the threshold value Vth, which is the output voltage value of the direct current voltage source 20. Also, although it may be arranged that the value of the threshold value Vth is zero Volts, and the count value falls below the threshold value Vth immediately before the main switching element FET1 is turned on, in the first embodiment, the value of the threshold value Vth is assumed to be the value of one count converted into voltage. The value of the threshold value Vth is designed as appropriate, and is not limited.

Figure 5:
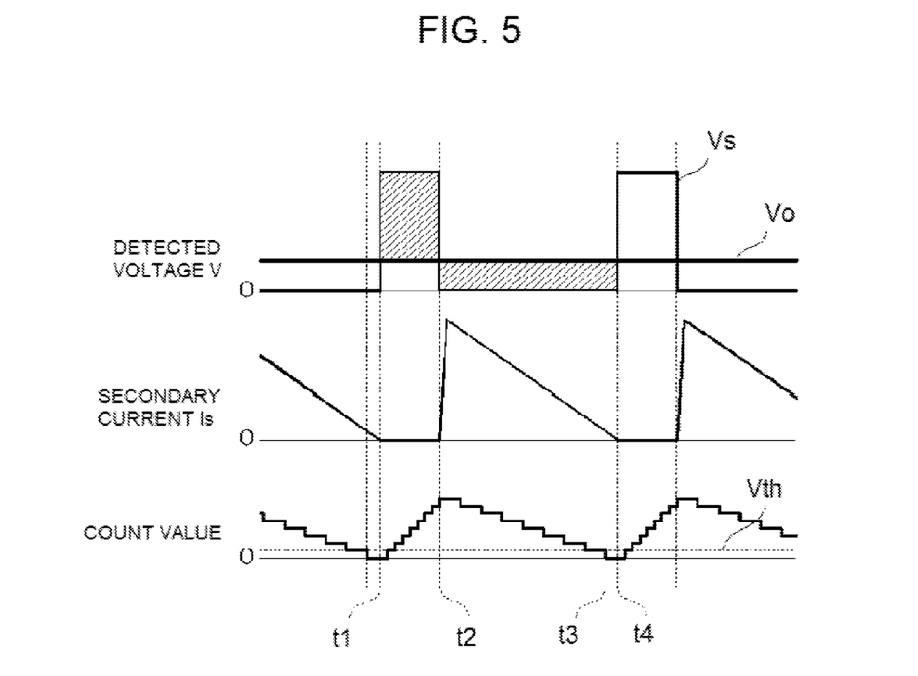
FIG. 5 is a diagram showing operating waveforms of various portions of the first embodiment of the invention.

FIG. 5 shows operating waveforms of various portions of the first embodiment of the invention, and a description will be given of a detailed operation of the switching power source device according to the first embodiment at t1 to t4 in the drawing. Operations at a "time t1" and a "time t4" are the same, operations from the "time t1" to a "period t3 to t4" described below form one cycle, and subsequent operations are a repeat thereof.

The main switching element FET1 is driven by the primary side control circuit 2, and the on/off signal of the primary side control circuit 2 varies in accordance with the output voltage. Herein, for the sake of simplification, it is assumed that the input voltage and output voltage are both constant, and that the on/off signal of the primary side control circuit 2 is also of a constant frequency.

The operating waveforms of the various portions of FIG. 5 are an example of the difference in potential between the element voltage Vs and output voltage Vo during a period in which the main switch is in an on-state being greater than the difference in potential between the element voltage Vs and output voltage Vo during a period in which the main switch is in an off-state. As the output frequency of the pulse generator unit 17 is proportional to the potential difference between the element voltage Vs and output voltage Vo, when the relationship between the sizes of the previously mentioned potential differences is reversed, the relationship between high and low output frequencies of the pulse generator unit 17 is also reversed.

Time t1

The main switching element FET1 switches to an on-state, and the current flowing through the primary winding N1 starts to increase. At the same time, voltage is generated in the secondary winding N2 so that the potential on the side connected to the drain terminal of the synchronous rectifier switching element FET2 increases (element voltage Vs>output voltage Vo).

As the output of the comparator 8 switches to an H level, the output of the comparator 9 switches to an L level, and the SRFF 12 is set, the inverted output of the SRFF 12 switches to an L level. The L level output of the SRFF 12 is input into the rise detection terminal of the MM 13, and the MM 13 maintains an L level output.

Because of the relationship wherein the element voltage Vs>the output voltage Vo, the output frequency of the pulse generator unit 17 increases.

The MM 14 detects the switch of the inverted output of the SRFF 12 to a L level, and outputs an H level. The H level output is input into the R terminal of the up/down counter 18, and the count value is reset to zero.

The output of the comparator 9 that has switched from an H level to an L level passes through the NOT circuit 15, becoming an H level output, and is input into the U/D terminal of the up/down counter 18. Therefore, the up/down counter 18 outputs a count value of zero (zero Volts), and the up/down counter 18 switches to a short cycle count-up operation.

The L level output of the MM 13 is input into the S terminal of the SRFF 21. Also, as the output of the up/down counter 18 is zero, the comparator 19 inputs an H level output into the R terminal of the SRFF 21. Therefore, as the SRFF 21 is reset and outputs an L level, the synchronous rectifier switching element FET2 maintains an off-state.

Period t1 to t2

As the main switching element FET1 is in an on-state, the current flowing through the primary winding N1 continues to increase, and energy is accumulated in the transformer T.

As the relationship wherein the element voltage Vs>the output voltage Vo is maintained, the inverted output of the SRFF 12 maintains an L level, and the output frequency of the pulse generator unit 17 maintains a high state. The output of the SRFF 12 maintained at an L level is input into the rise detection terminal of the MM 13, and the MM 13 maintains an L level output.

The output of the SRFF 12 maintained at an L level is input into the fall detection terminal of the MM 14, and the MM 14 switches to an L level. The L level is maintained until the time t2.

With no variation in the output of the comparator 9, the up/down counter 18 maintains the count-up operation. Therefore, the up/down counter 18 counts up in a short cycle.

The L level output of the MM 13 is input into the S terminal of the SRFF 21. Also, as the output voltage value of the up/down counter 18 swiftly exceeds the threshold value Vth of the comparator 19, the L level output of the comparator 19 is input into the R terminal of the SRFF 21. Therefore, as the SRFF 21 maintains the same state, outputting an L level, the synchronous rectifier switching element FET2 maintains an off-state.

Time t2

The main switching element FET1 switches to an off-state, and the current flowing through the primary winding N1 starts to decrease. At the same time, voltage is generated in the secondary winding N2 so that the potential on the side connected to the drain terminal of the synchronous rectifier switching element FET2 decreases (element voltage Vs>output voltage Vo).

As the output of the comparator 8 switches to an L level, the output of the comparator 9 switches to an H level, and the SRFF 12 is reset, the inverted output of the SRFF 12 switches to an H level.

The output of the SRFF 12 that has switched from an L level to an H level is input into the rise detection terminal of the MM 13, and the output of the MM 13 switches to an H level.

Because of the relationship wherein the element voltage Vs<the output voltage Vo, the output frequency of the pulse generator unit 17 decreases.

The output of the SRFF 12 that has switched from an L level to an H level is input into the fall detection terminal of the MM 14, and the MM 14 maintains an L level.

The output of the comparator 9 that has switched from an L level to an H level passes through the NOT circuit 15, becoming an L level output, and is input into the U/D terminal of the up/down counter 18. Therefore, the up/down counter 18 switches to a long cycle count-down operation.

The output of the MM 13 that has switched to an H level is input into the S terminal of the SRFF 21. As the up/down counter 18 counts up, and outputs a voltage value proportional to the count value that is higher than the threshold value Vth, the output of the comparator 19 maintains an L level. The L level output is input into the R terminal of the SRFF 21. Therefore, the output of the SRFF 21 switches to an H level, and the synchronous rectifier switching element FET2 switches to an on-state.

Period t2 to t3

As the main switching element FET1 is in an off-state, the energy of the transformer T is discharged, and the current flowing through the primary winding N1 continues to decrease.

With no variation in the input and output of the SRFF 12, the inverted output of the SRFF 12 maintains an H level. As the relationship wherein the element voltage Vs<the output voltage Vo is maintained, the inverted output of the SRFF 12 maintains an H level, and the output frequency of the pulse generator unit 17 maintains a low state.

The output of the SRFF 12 maintained at an H level is input into the rise detection terminal of the MM 13, and the output of the MM 13 switches to, and is maintained at, an L level.

The output of the SRFF 12 maintained at an H level is input into the fall detection terminal of the MM 14, and the MM 14 maintains an L level.

With no variation in the output of the comparator 9, the up/down counter 18 maintains the count-down operation. Therefore, the up/down counter 18 counts down in a long cycle.

The output of the MM 13 that has switched to an L level is input into the S terminal of the SRFF 21. As the up/down counter 18 outputs a voltage value proportional to the count value that is higher than the threshold value Vth, the output of the comparator 19 maintains an L level. Therefore, the output of the SRFF 21 maintains an H level, and the synchronous rectifier switching element FET2 maintains an on-state.

Time t3

As the main switching element FET1 is in an off-state, the energy of the transformer T is discharged, and the current flowing through the primary winding N1 continues to decrease.

As the relationship wherein the element voltage Vs<the output voltage Vo is maintained, the inverted output of the SRFF 12 maintains an H level, and the output frequency of the pulse generator unit 17 maintains a low state.

The output of the SRFF 12 maintained at an H level is input into the rise detection terminal of the MM 13, and the MM 13 maintains an L level output.

The output of the SRFF 12 maintained at an H level is input into the fall detection terminal of the MM 14, and the MM 14 maintains an L level.

With no variation in the output of the comparator 9, the up/down counter 18 maintains the count-down operation. Therefore, the up/down counter 18 counts down in a long cycle.

The output of the MM 13 maintained at an L level is input into the S terminal of the SRFF 21. Also, the output voltage value proportional to the count value of the up/down counter 18 falls below the threshold value Vth, and the output of the comparator 19 switches to an H level. The output of the comparator 19 that has switched to an H level is input into the R terminal of the SRFF 21. Therefore, the output of the SRFF 21 switches to an L level, and the synchronous rectifier switching element FET2 switches to an off-state.

Period t3 to t4

As the main switching element FET1 is in an off-state, the energy of the transformer T is discharged, and the current flowing through the primary winding N1 continues to decrease.

As the relationship wherein the element voltage Vs<the output voltage Vo is maintained, the inverted output of the SRFF 12 maintains an H level, and the output frequency of the pulse generator unit 17 maintains a low state.

The output of the SRFF 12 maintained at an H level is input into the rise detection terminal of the MM 13, and the MM 13 maintains an L level output.

The output of the SRFF 12 maintained at an H level is input into the fall detection terminal of the MM 14, and the MM 14 maintains an L level.

With no variation in the output of the comparator 9, the up/down counter 18 maintains the count-down operation. Therefore, the up/down counter 18 counts down in a long cycle.

The output of the MM 13 maintained at an H level is input into the S terminal of the SRFF 21. Also, as the output voltage value proportional to the count value of the up/down counter 18 is lower than the threshold value Vth, the output of the comparator 19 maintains an H level, and is input into the R terminal of the SRFF 21. Therefore, the output of the SRFF maintains an L level, and the synchronous rectifier switching element FET2 maintains an off-state.

As heretofore described, the switching power source device according to the first embodiment of the invention utilizes the fact that the accumulated energy and discharged energy of the transformer T are equal. Further, when the accumulated or discharged energy of the transformer T is converted into a count value, the count becomes zero at the point at which all the energy of the transformer T has been discharged. That is, by the synchronous rectifier switching element FET2 being turned off immediately before the count value becomes zero, power is prevented from flowing back from the direct current voltage output side.

As the accumulated energy and discharged energy of the transformer T are equal, it can be said that the products of potential difference×time in (1) and (2) below are equal.

(1) The product of the difference in potential between the element voltage and output voltage×the time for which the main switching element FET1 is in an on-state.

(2) The product of the difference in potential between the element voltage and output voltage×the time for which the main switching element FET1 is in an off-state.

That is, the count values in (3) and (4) below are equal.

(3) The count value reached by counting at a frequency proportional to the difference in potential between the element voltage and output voltage in a period for which the main switching element FET1 is in an on-state.

(4) The count value reached by counting at a frequency proportional to the difference in potential between the element voltage and output voltage in a period for which the main switching element FET1 is in an off-state.

Consequently, it is sufficient that the timing at which the count value in (4) becomes equal to the count value in (3) is taken to be the timing at which the synchronous rectifier switching element FET2 is turned off.

As the up/down counter 18 is used as the counter unit in the first embodiment of the invention, the count value returns to zero in one on/off cycle of the main switching element FET1.

Also, the timing at which the synchronous rectifier switching element FET2 is turned off can be accurately determined by appropriately determining the frequency of the pulse generator unit 17 and the threshold value Vth. Therefore, as it is possible to utilize the synchronous rectification period to the maximum, it is possible to make the efficiency of the device high.

Second Embodiment

Figure 4:
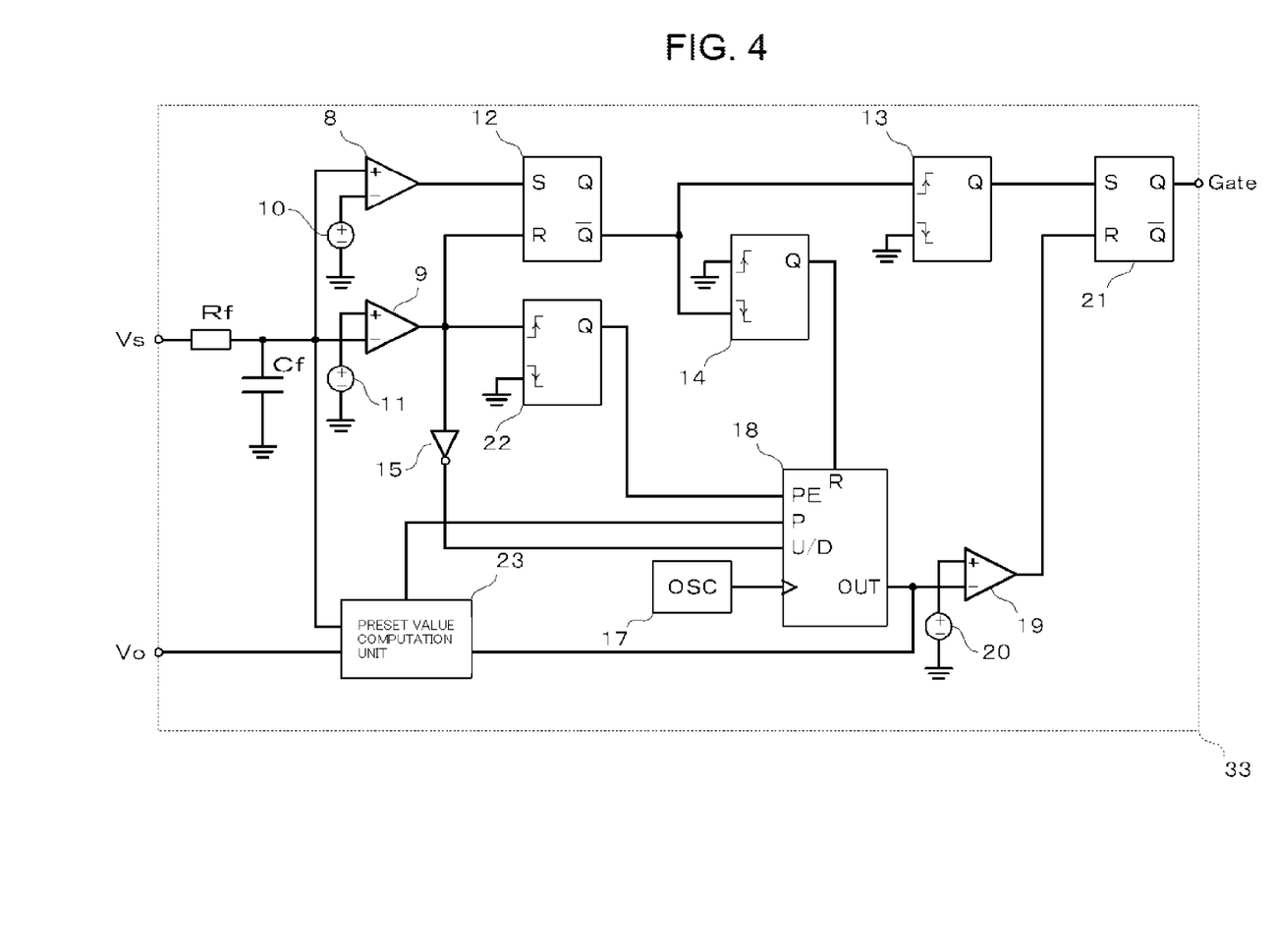
FIG. 4 is a diagram showing the drive control unit of the second embodiment of the invention.

FIG. 4 is a diagram showing one example of the drive control unit 1 according to a second embodiment of the invention. Next, a description will be given of the configuration of the drive control unit 1 according to the second embodiment. The drive control unit 1 according to the second embodiment of the invention, in the same way as in the switching power source device of the first embodiment, has portions corresponding to the main switching element state detection unit 3, counter unit 6, and on/off control unit 7. Also, the portion corresponding to the variable pulse generator unit 5 is replaced with the fixed frequency pulse generator unit 17, a preset value computation unit 23, and a preset permission unit. As the primary side control circuit 2 is a general drive circuit, a description is omitted.

The portion in FIG. 4 corresponding to the main switching element state detection unit 3 of FIG. 2 is of the same configuration as in the first embodiment.

A description will be given of the preset value computation unit 23 and preset permission unit. Input terminals of the preset value computation unit 23 are connected to the element voltage detection terminal Vs via the RC filter, to the output voltage detection terminal Vo, and to the output terminal of the up/down counter 18. The output terminal of the preset value computation unit 23 is connected to a preset value input terminal P of the up/down counter 18. The clock pulse input terminal of the up/down counter 18 is connected to the output terminal of the pulse generator unit 17.

A description will be given of the portion in FIG. 4 corresponding to the counter unit 6 of FIG. 2. The up/down counter 18 counts up or counts down every time a pulse is input into the clock pulse input terminal. Herein, the U/D terminal of the up/down counter 18 is connected via the NOT circuit 15 to the output terminal of the comparator 9, a count-up operation is carried out when an H level is input, and a count-down operation is carried out when an L level is input. The reset terminal R of the up/down counter 18 is connected to the output terminal of the MM 14. The input terminal of the MM 14 is a fall detector, and is connected to the inverted output terminal of the SRFF 12. A preset permission signal input terminal PE of the up/down counter 18 is connected to the output terminal of an MM 22. The input terminal of the MM 22 is a rise detector, and is connected to the output terminal of the comparator 9. The output of the up/down counter 18 is connected to the negative input terminal of the comparator 19, and the output terminal of the comparator 19 is connected to the SRFF 21. The positive input terminal of the comparator 19 is connected to the direct current voltage source 20, and the predetermined threshold value Vth is input into the comparator 19.

The output terminal of the on/off control unit 7 of FIG. 2 in FIG. 4 is connected via the Gate terminal to the control terminal of the synchronous rectifier switching element FET2.

An outline of an operation of the switching power source device according to the second embodiment of the invention is the same as that in the first embodiment.

Figure 6:
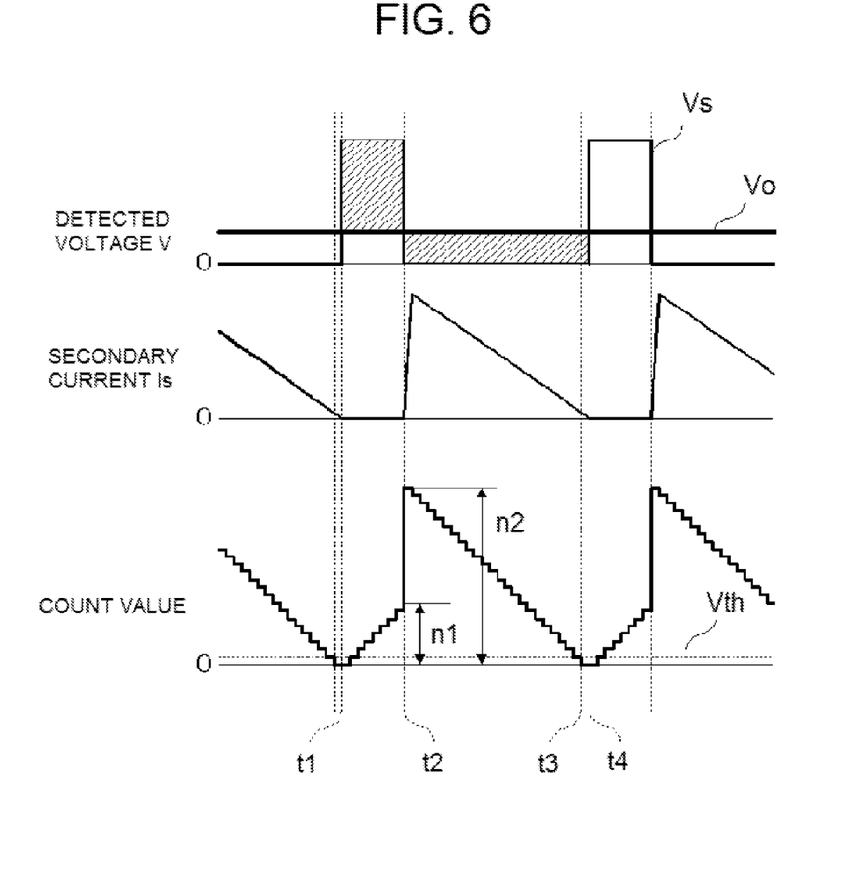
FIG. 6 is a diagram showing operating waveforms of various portions of the second embodiment of the invention.

FIG. 6 shows operating waveforms of various portions of a second embodiment of the invention, and a description will be given of a detailed operation of the switching power source device according to the second embodiment at t1 to t4 in the drawing. Operations at the "time t1" and the "time t4" are the same, operations from the "time t1" to the "period t3 to t4" described below form one cycle, and subsequent operations are a repeat thereof.

The main switching element FET1 is driven by the primary side control circuit 2, and the on/off signal of the primary side control circuit 2 varies in accordance with the output voltage. Herein, for the sake of simplification, it is assumed that the input voltage and output voltage are both constant, and that the on/off signal of the primary side control circuit 2 is also of a constant frequency.

The element voltage Vs, output voltage Vo, and a count value n1 are input into the preset value computation unit 23, and the preset value computation unit 23 inputs the result of computing "the count value n1 (element voltage Vs−output voltage Vo)/output voltage Vo" into the preset value input terminal of the up/down counter 18.

Time t1

The main switching element FET1 switches to an on-state, and the current flowing through the primary winding N1 starts to increase. At the same time, voltage is generated in the secondary winding N2 so that the potential on the side connected to the drain terminal of the synchronous rectifier switching element FET2 increases (element voltage Vs>output voltage Vo).

As the output of the comparator 8 switches to an H level, the output of the comparator 9 switches to an L level, and the SRFF 12 is set, the inverted output of the SRFF 12 switches to an L level. The L level output of the SRFF 12 is input into the rise detection terminal of the MM 13, and the MM 13 maintains an L level output.

The MM 14 detects the switch of the inverted output of the SRFF 12 to a low level, and outputs an H level. The H level output is input into the R terminal of the up/down counter 18, and the count value is reset to zero.

The output of the comparator 9 that has switched from an H level to an L level passes through the NOT circuit 15, becoming an H level output, and is input into the U/D terminal of the up/down counter 18. Therefore, the up/down counter 18 outputs a count value of zero (zero Volts), and the up/down counter 18 switches to a short cycle count-up operation.

As the output of the comparator 9 is not rising, the MM 22 outputs an L level to the preset permission signal input terminal PE of the up/down counter 18.

The L level output of the MM 13 is input into the S terminal of the SRFF 21. Also, as the output of the up/down counter 18 is zero, the comparator 19 inputs an H level output into the R terminal of the SRFF 21. Therefore, as the SRFF 21 is reset and outputs an L level, the synchronous rectifier switching element FET2 maintains an off-state.

Period t1 to t2

As the main switching element FET1 is in an on-state, the current flowing through the primary winding N1 continues to increase, and energy is accumulated in the transformer T.

As the relationship wherein the element voltage Vs>the output voltage Vo is maintained, the inverted output of the SRFF 12 maintains an L level. The output of the SRFF 12 maintained at an L level is input into the rise detection terminal of the MM 13, and the MM 13 maintains an L level output.

The output of the SRFF 12 maintained at an L level is input into the fall detection terminal of the MM 14, and the MM 14 switches to an L level. The L level is maintained until the time t2.

With no variation in the output of the comparator 9, the up/down counter 18 maintains a count-up operation at the frequency input from the pulse generator unit 17.

The output of the comparator 9 maintained at an L level is input into the rise detection terminal of the MM 22, and an L level is output to the preset permission signal input terminal PE of the up/down counter 18.

The L level output of the MM 13 is input into the S terminal of the SRFF 21. Also, as the output voltage value of the up/down counter 18 swiftly exceeds the threshold value Vth of the comparator 19, the L level output of the comparator 19 is input into the R terminal of the SRFF 21. Therefore, as the SRFF 21 maintains the same state, outputting an L level, the synchronous rectifier switching element FET2 maintains an off-state.

Time t2

The main switching element FET1 switches to an off-state, and the current flowing through the primary winding N1 starts to decrease. At the same time, voltage is generated in the secondary winding N2 so that the potential on the side connected to the drain terminal of the synchronous rectifier switching element FET2 decreases (element voltage Vs>output voltage Vo).

As the output of the comparator 8 switches to an L level, the output of the comparator 9 switches to an H level, and the SRFF 12 is reset, the inverted output of the SRFF 12 switches to an H level.

The output of the SRFF 12 that has switched from an L level to an H level is input into the rise detection terminal of the MM 13, and the output of the MM 13 switches to an H level.

The output of the SRFF 12 that has switched from an L level to an H level is input into the fall detection terminal of the MM 14, and the MM 14 maintains an L level.

The output of the comparator 9 that has switched from an L level to an H level passes through the NOT circuit 15, becoming an L level output, and is input into the U/D terminal of the up/down counter 18. Therefore, the up/down counter 18 switches to a count-down operation.

The output of the comparator 9 that has switched from an L level to an H level is input into the rise detection terminal of the MM 22, and an H level is output to the preset permission signal input terminal PE of the up/down counter 18.

At this time, the preset value of "the count value n1 (element voltage Vs−output voltage Vo)/output voltage Vo" computed by the preset computation unit is input as the count value into the up/down counter 18.

The output of the MM 13 that has switched to an H level is input into the S terminal of the SRFF 21. As the up/down counter 18 outputs a voltage value proportional to the count value input from the preset computation unit that is higher than the threshold value Vth, the output of the comparator 19 maintains an L level. The L level output is input into the R terminal of the SRFF 21. Therefore, the output of the SRFF 21 switches to an H level, and the synchronous rectifier switching element FET2 switches to an on-state.

Period t2 to t3

As the main switching element FET1 is in an off-state, the energy of the transformer T is discharged, and the current flowing through the primary winding N1 continues to decrease.

As the relationship wherein the element voltage Vs<the output voltage Vo is maintained, the inverted output of the SRFF 12 maintains an H level.

The output of the SRFF 12 maintained at an H level is input into the rise detection terminal of the MM 13, and the output of the MM 13 switches to, and is maintained at, an L level.

The output of the SRFF 12 maintained at an H level is input into the fall detection terminal of the MM 14, and the MM 14 maintains an L level.

With no variation in the output of the comparator 9, the up/down counter 18 maintains the count-down operation.

The output of the comparator 9 maintained at an H level is input into the rise detection terminal of the MM 22, and an L level is output to the preset permission signal input terminal PE of the up/down counter 18.

The output of the MM 13 that has switched to an L level is input into the S terminal of the SRFF 21. As the up/down counter 18 outputs a voltage value proportional to the count value that is higher than the threshold value Vth, the output of the comparator 19 maintains an L level. Therefore, the output of the SRFF 21 maintains an H level, and the synchronous rectifier switching element FET2 maintains an on-state.

Time t3

As the main switching element FET1 is in an off-state, the energy of the transformer T is discharged, and the current flowing through the primary winding N1 continues to decrease.

As the relationship wherein the element voltage Vs<the output voltage Vo is maintained, the inverted output of the SRFF 12 maintains an H level.

The output of the SRFF 12 maintained at an H level is input into the rise detection terminal of the MM 13, and the MM 13 maintains an L level output.

The output of the SRFF 12 maintained at an H level is input into the fall detection terminal of the MM 14, and the MM 14 maintains an L level.

With no variation in the output of the comparator 9, the up/down counter 18 maintains the count-down operation.

The output of the MM 13 maintained at an L level is input into the S terminal of the SRFF 21. Also, the output voltage value proportional to the count value of the up/down counter 18 falls below the threshold value Vth, and the output of the comparator 19 switches to an H level. The output of the comparator 19 that has switched to an H level is input into the R terminal of the SRFF 21. Therefore, the output of the SRFF 21 switches to an L level, and the synchronous rectifier switching element FET2 switches to an off-state.

Period t3 to t4

As the main switching element FET1 is in an off-state, the energy of the transformer T is discharged, and the current flowing through the primary winding N1 continues to decrease.

As the relationship wherein the element voltage Vs<the output voltage Vo is maintained, the inverted output of the SRFF 12 maintains an H level.

The output of the SRFF 12 maintained at an H level is input into the rise detection terminal of the MM 13, and the MM 13 maintains an L level output.

The output of the SRFF 12 maintained at an H level is input into the fall detection terminal of the MM 14, and the MM 14 maintains an L level.

With no variation in the output of the comparator 9, the up/down counter 18 maintains the count-down operation.

The output of the MM 13 maintained at an H level is input into the S terminal of the SRFF 21. Also, as the output voltage value proportional to the count value of the up/down counter 18 is lower than the threshold value Vth, the output of the comparator 19 maintains an H level, and is input into the R terminal of the SRFF 21. Therefore, the output of the SRFF maintains an L level, and the synchronous rectifier switching element FET2 maintains an off-state.

As heretofore described, the switching power source device according to the second embodiment of the invention is the same as in the first embodiment, except that the preset value computed by "the count value n1 (element voltage Vs−output voltage Vo)/output voltage Vo" is input into the up/down counter 18 when it is detected that the main switching element FET1 has switched to an off-state, and that the counter frequency is constant.

Herein, the computation of the preset value is based on the concepts of (5) and (6) below, which are based on (1) to (4) of the first embodiment.

(5) The lengths of a period for which the main switching element FET1 is in an on-state and a period for which the main switching element FET1 is in an off-state are proportional.

(6) The difference in potential between the element voltage Vs and output voltage Vo in a period for which the main switching element FET1 is in an on-state and the length of a period for which the main switching element FET1 is in an off-state are proportional.

Consequently, it is possible to calculate the period for which the main switching element FET1 is in an off-state from the period for which the main switching element FET1 is in an on-state and the difference in potential between the element voltage Vs and output voltage Vo.

Also, as counting is carried out at a constant frequency in the second embodiment, regardless of the on/off state of the main switching element FET1, there is little temporal error in one count, and it is possible to generate turn-off timing with greater accuracy than in the first embodiment. That is, it is possible to make efficiency higher than in the first embodiment.

Third Embodiment

Figure 7:
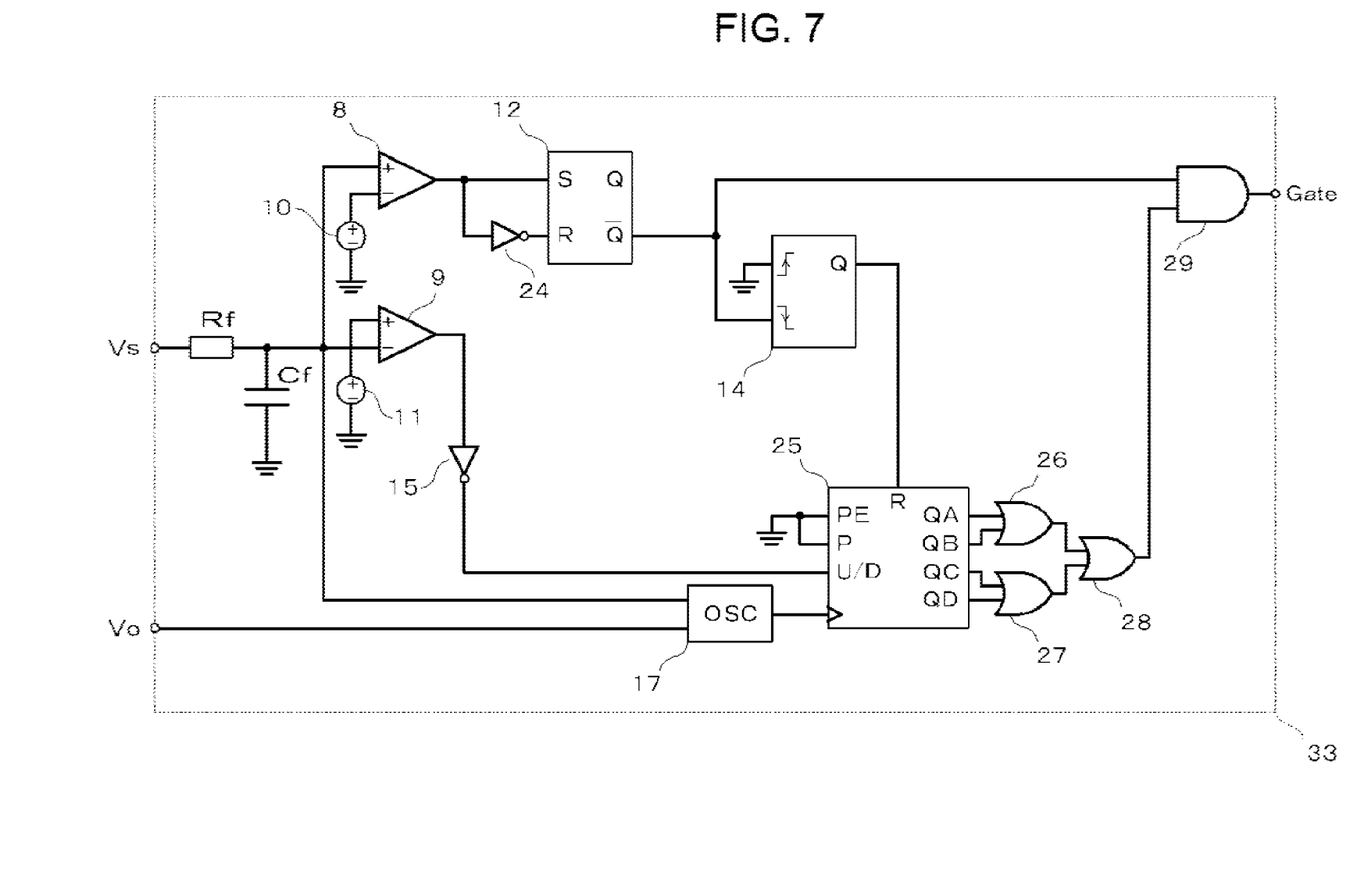
FIG. 7 is a diagram showing the drive control unit of the third embodiment of the invention.

FIG. 7 is a diagram showing one example of the drive control unit 1 according to a third embodiment of the invention. Next, a description will be given of the configuration of the drive control unit 1 according to the third embodiment. The drive control unit 1 according to the third embodiment of the invention, in the same way as in the switching power source device of the first embodiment, has portions corresponding to the main switching element state detection unit 3, variable pulse generator unit 5, counter unit 6, and on/off control unit 7 in FIG. 2. As the primary side control circuit 2 is a general drive circuit, a description is omitted.

A description will be given of differences in FIG. 7 from the drive control unit of FIG. 3. The first is that the connection of the output of the comparator 9 and R terminal of the SRFF 12 is eliminated, and a NOT circuit 24 is connected between the output of the comparator 8 and R terminal of the SRFF 12. The second is that an AND circuit 29 is adopted as the on/off control unit 7. The third is that the inverted output terminal of the SRFF 12 is connected to one input terminal of the AND circuit 29, which is the on/off control unit 7, without passing through the MM 13.

A place in FIG. 7 corresponding to the variable pulse generator unit 5 of FIG. 2 is of the same configuration as in the first embodiment. The portion corresponding to the variable pulse generator unit 5 of FIG. 2, not being particularly limited, may also be of the same configuration as in the second embodiment.

A place in FIG. 7 corresponding to the counter unit 6 of FIG. 2 is the same as in the first embodiment, except that the up/down counter 18 is replaced with an up/down counter 25 with a different output side, and digitalized. The portion corresponding to the counter unit 6 of FIG. 2, not being limited, may also be that applied in the configuration of the second embodiment.

The output side of the up/down counter 25 of FIG. 7 has four bits of digital output terminal QA to QD, wherein the QA and QB terminals are each connected to input terminals of an OR circuit 26, while the QC and QD terminals are each connected to input terminals of an OR circuit 27. The output terminals of the OR circuits 26 and 27 are each connected to input terminals of an OR circuit 28. The output terminal of the OR circuit 28 is connected to the other input terminal of the AND circuit 29.

A place in FIG. 7 corresponding to the on/off control unit 7 of FIG. 2 is such that the output terminal of the AND circuit 29 is connected via the Gate terminal to the control terminal of the synchronous rectifier switching element FET2.

An outline of an operation of the switching power source device according to the third embodiment of the invention is the same as that in the first embodiment.

Operating waveforms of various portions of the third embodiment of the invention are the same as those in the first embodiment shown in FIG. 5.

In the third embodiment of the invention, the output of the comparator 8 inverted by the SRFF 12 is input into one input terminal of the AND circuit 29. That is, an L level is input into one input terminal of the AND circuit 29 during a period for which the main switching element FET1 is in an on-state, while an H level is input during a period for which the main switching element FET1 is in an off-state. Also, owing to the configuration of the OR circuits 26 to 28, the output of the OR circuit 28 input into the other input terminal of the AND circuit 29 is an H level only when all outputs QA to QD of the up/down counter 25 are an L level. As a result, the period for which the output of the AND circuit 29 is an H level and the synchronous rectifier switching element FET2 is in an on-state is the period t2 to t3 of FIG. 5.

Consequently, by increasing the resolution of the output of the up/down counter 25, it is possible to lengthen the synchronous rectification period t2 to t3. Also, by the output of the up/down counter 25 being digitalized, it is possible to generate the timing at which the synchronous rectifier switching element FET2 is turned off with greater accuracy than in the first and the second embodiments. That is, by the places of the third embodiment corresponding to the main switching element state detection unit 3, counter unit 6, and on/off control unit 7 in FIG. 2 being applied to the first and the second embodiments, it is possible to make efficiency high.

Fourth Embodiment

Figure 8:
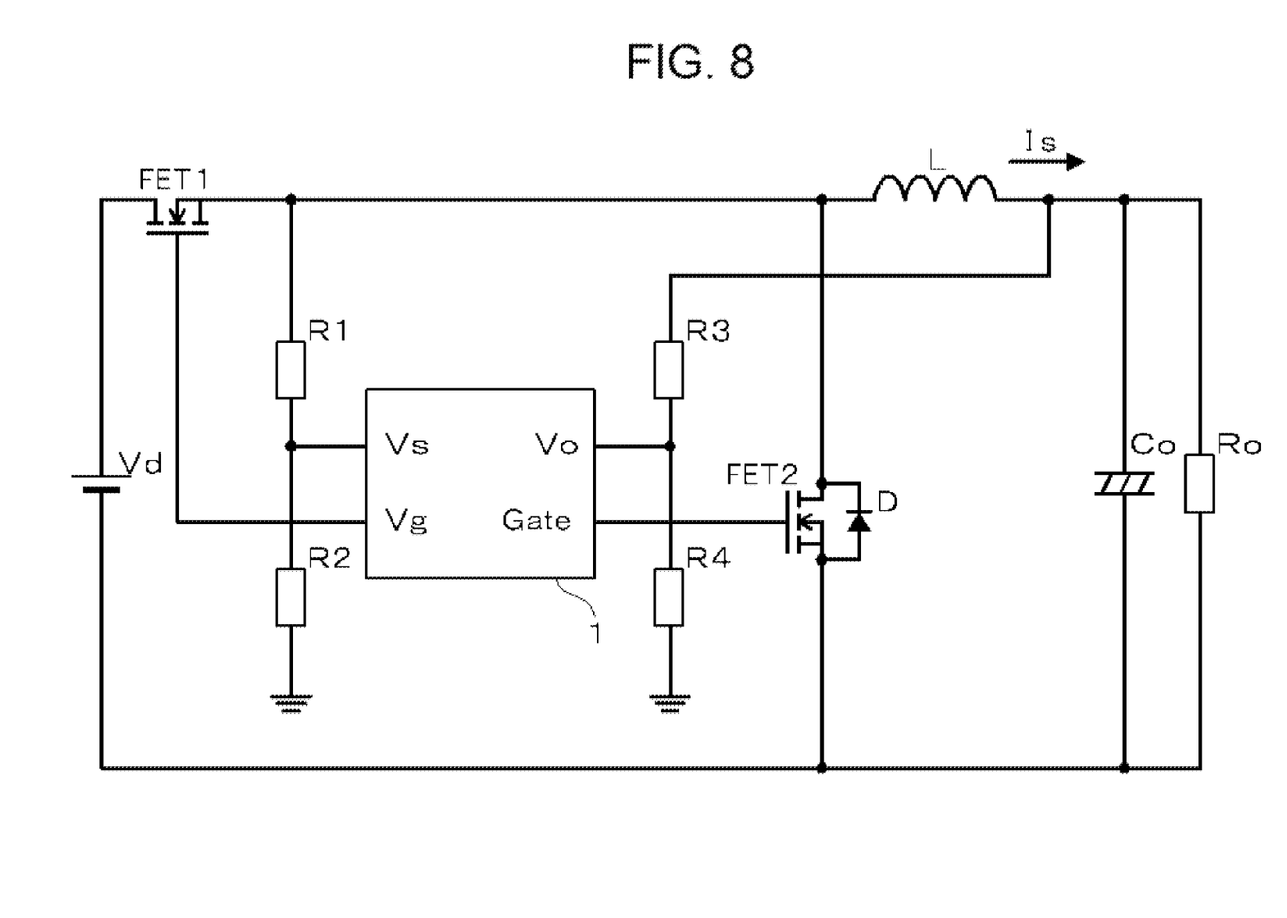
FIG. 8 is a diagram showing a main circuit of the fourth embodiment of the invention.

FIG. 8 is a diagram showing a non-isolated switching power source device, in which no transformer is used, according to a fourth embodiment of the invention, wherein portions given the same reference signs as in FIG. 9 represent the same portions. Next, a description will be given of the circuit configuration of the fourth embodiment. The circuit of the fourth embodiment of the invention is configured by having direct current voltage input terminals, the main switching element FET1 and synchronous rectifier switching element FET2, which switch direct current voltage, connected in series between the direct current voltage input terminals, an inductor L connected to a connection point of the main switching element FET1 and synchronous rectifier switching element FET2, the voltage detecting voltage divider resistors R1 to R4, and the drive control unit 1, which drives the switching elements, wherein a series circuit of the synchronous rectifier switching element FET2 and inductor L is connected in series between direct current voltage output terminals.

The voltage divider resistors R1 and R2 are connected between the drain of the synchronous rectifier switching element FET2 and the ground, while the voltage divider resistors R3 and R4 are connected between a direct current voltage output terminal and the ground. The drive control unit 1 is such that the element voltage detection terminal Vs is connected to a connection portion of the voltage divider resistors R1 and R2, while the output voltage detection terminal Vo is connected to a connection portion of the voltage divider resistors R3 and R4. Also, Vg is connected to the control terminal of the main switching element FET1, while Gate is connected to the control terminal of the synchronous rectifier switching element FET2.

As any of the units according to the first to the third embodiments shown in FIGS. 3, 4, and 7 may be used as the drive control unit 1, and a detailed operation is the same as in the first to the third embodiments, a description is omitted. With the switching power source device according to the fourth embodiment of the invention too, it is possible to accurately determine the timing at which the synchronous rectifier switching element FET2 is turned off. Therefore, as it is possible to utilize the synchronous rectification period to the maximum, it is possible to make the efficiency of the device high.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

DESCRIPTION OF REFERENCES AND SIGNS 1 drive control unit
5 variable pulse generator unit
6 counter unit

What is claimed is:

1. A switching power source device that converts direct current voltage applied to input terminals and outputs direct current voltage from output terminals, wherein
    a main switching element connected in series to a primary winding of a transformer is connected between the input terminals, and
    a synchronous rectifier switching element connected in series to a secondary winding of the transformer is connected between the output terminals,
    the switching power source device comprising:
    a rectifier element connected in parallel to the synchronous rectifier switching element;
    a drive control unit that drives the main switching element and synchronous rectifier switching element;
    an element voltage detection unit that detects a value of a voltage across the synchronous rectifier switching element;
    an output voltage detection unit that detects a value of an output voltage between the output terminals;
    a variable pulse generator unit that generates a clock pulse of a frequency in accordance with a difference between the value of the voltage across the synchronous rectifier switching element and the output voltage value detected by the element voltage detection unit and the output voltage detection unit;
    a counter unit that increases or reduces a count value in accordance with the clock pulse; and
    an on/off control unit that maintains the synchronous rectifier switching element in an on-state until the main switching element is turned off and the count value reaches a predetermined value.

2. The switching power source device according to claim 1, comprising:
    a preset value computation circuit, connected to the counter unit, that computes a count value to be set in the counter unit using the value of the voltage across the synchronous rectifier switching element, the value of the output voltage between the direct current output terminals, and a time for which the main switching element is in an on-state; and a preset permission unit that, when detecting an instant at which the main switching element switches to an off-state, inputs the count value into the counter unit.

3. The switching power source device according to claim 1, wherein
an off-state of the main switching element is detected by one of a control signal that drives the main switching element, the element voltage detection unit, or a detection unit that detects a voltage across the transformer.

4. The switching power source device according to claim 1, wherein
the counter unit has an up/down switch circuit that switches between counting up and counting down in accordance with an on/off state of the main switching element.

5. A switching power source device that converts direct current voltage applied to direct current input terminals and outputs direct current voltage from direct current output terminals, wherein
a first series circuit configured of a synchronous rectifier switching element and a main switching element is connected between the direct current input terminals,
one end of an inductor is connected to a connection point of the main switching element and synchronous rectifier switching element, and
a second series circuit configured of the synchronous rectifier switching element and inductor is connected between the direct current output terminals,
the device comprising:
a drive control unit that drives the main switching element and synchronous rectifier switching element;
an element voltage detection unit that detects a value of a voltage across the synchronous rectifier switching element;
an output voltage detection unit that detects a value of an output voltage between the direct current output terminals;
a variable pulse generator unit that generates a clock pulse of a frequency in accordance with a difference between the value of the voltage across the synchronous rectifier switching element and the output voltage value detected by the output voltage detection unit;
a counter unit that increases or reduces a count value in accordance with the clock pulse; and
an on/off control unit that maintains the synchronous rectifier switching element in an on-state until the main switching element is turned off and the count value reaches a predetermined value.

6. The switching power source device according to claim 5, wherein
an off-state of the main switching element is detected by one of a control signal that drives the main switching element, the element voltage detection unit, or a detection unit that detects a voltage across the transformer.

7. An apparatus, comprising:
a synchronous rectifier switching element configured to at least partly control a duration of a synchronous rectification period based on an on/off state of the synchronous rectifier switching element; and
a timer device configured to control the on/off state of the synchronous rectifier switching element based on a difference in voltage between a voltage across the synchronous rectifier switching element and an output voltage of a switching power source device;
wherein the timer device comprises
a counter device configured to output a count value based on the difference in voltage, and
a pulse generation device coupled to the counter device, and configured to output to the counter device a sequence of pulses at a frequency that is proportional to the difference in voltage.

8. The apparatus of claim 7, wherein the count value is configured to turn off the synchronous rectifier switching element before a main switching element of the switching power source device is turned on.

9. The apparatus of claim 7, wherein the timer device is configured to output the count value as one of a sequence of stepped voltages.

10. The apparatus of claim 9, wherein the sequence of stepped voltages corresponds to an on/off cycle of the main switching element.

* * * * *